(12) United States Patent
Chen et al.

(10) Patent No.: US 9,971,490 B2
(45) Date of Patent: May 15, 2018

(54) DEVICE CONTROL (71) Applicant: Microsoft Technology Licensing, LLC, Redmond, WA (US)

(72) Inventors: Yinpeng Chen, Sammamish, WA (US); Zicheng Liu, Bellevue, WA (US); Zhengyou Zhang, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 550 days.

(21) Appl. No.: 14/597,138

(22) Filed: Jan. 14, 2015

(65) Prior Publication Data
US 2015/0242107 A1    Aug. 27, 2015

Related U.S. Application Data

(60) Provisional application No. 61/944,917, filed on Feb. 26, 2014.

(51) Int. Cl.
| | | |
|---|---|---|
| *G06F 3/048* | (2013.01) | |
| *G06F 3/0484* | (2013.01) | |
| *G06F 3/01* | (2006.01) | |
| *G06F 3/0488* | (2013.01) | |
| *H04N 13/02* | (2006.01) | |

(Continued)

(52) U.S. Cl.
CPC .......... *G06F 3/04847* (2013.01); *G06F 3/017* (2013.01); *G06F 3/0484* (2013.01); *G06F 3/0488* (2013.01); *G06F 3/04842* (2013.01); *G06F 3/04883* (2013.01); *G06F 21/32* (2013.01); *H04N 9/04* (2013.01); *H04N 13/0271* (2013.01); *G06F 2203/04101* (2013.01)

(58) Field of Classification Search
CPC .. G06F 3/04847; G06F 3/04883; A63F 13/06; H04N 13/0271
See application file for complete search history.

(56) References Cited

U.S. PATENT DOCUMENTS 6,963,937 B1 * 11/2005 Kamper .................. G06F 3/038
345/156
8,665,238 B1 * 3/2014 Gossweiler, III ..... G06F 3/0488
345/173

(Continued)

FOREIGN PATENT DOCUMENTS

| WO | WO 2013056157 A1 * | 4/2013 | ............. G06F 3/041 |
|---|---|---|---|
| WO | 2013/102267 A1 | 7/2013 | |

OTHER PUBLICATIONS

Communication pursuant to Rules 161(1) and 162 EPC dated Oct. 5, 2016 from European Patent Application No. 15705166.5, 2 pages.

(Continued)

*Primary Examiner* — Ryan Pitaro
(74) *Attorney, Agent, or Firm* — Rainier Patents, P.S.

(57) ABSTRACT

The description relates to interactions with a display device. In one example, the interactions can include detecting a user proximate to a display and detecting a non-touch control gesture performed by the user proximate to the display. The example can also include presenting a graphical user interface (GUI) on the display that includes options associated with the control gesture. The example can also include receiving user input selecting one of the options and receiving additional user input from the user to interact with the GUI via the selected one of the options.

20 Claims, 11 Drawing Sheets

(51) Int. Cl.
*H04N 9/04* (2006.01)
*G06F 21/32* (2013.01)

(56) References Cited

U.S. PATENT DOCUMENTS

| | | | | |
|---|---|---|---|---|
| 8,760,426 B1* | 6/2014 | Strand | ................ | G09G 5/00 |
| | | | | 345/169 |
| 8,854,433 B1* | 10/2014 | Rafii | ................ | G06F 3/017 |
| | | | | 348/42 |
| 9,389,779 B2* | 7/2016 | Anderson | ................ | G06F 3/017 |
| 2010/0060570 A1* | 3/2010 | Underkoffler | ................ | G06F 3/017 |
| | | | | 345/156 |
| 2010/0302247 A1* | 12/2010 | Perez | ................ | G06K 9/00201 |
| | | | | 345/440 |
| 2010/0306716 A1* | 12/2010 | Perez | ................ | A63F 13/213 |
| | | | | 715/863 |
| 2011/0060986 A1* | 3/2011 | Yang | ................ | G06F 3/04845 |
| | | | | 715/702 |
| 2011/0131502 A1 | 6/2011 | Ryu et al. | | |
| 2011/0134047 A1* | 6/2011 | Wigdor | ................ | G06F 3/04883 |
| | | | | 345/173 |
| 2011/0179368 A1* | 7/2011 | King | ................ | G06F 3/04815 |
| | | | | 715/769 |
| 2011/0197147 A1* | 8/2011 | Fai | ................ | G06F 1/1639 |
| | | | | 715/753 |
| 2011/0244956 A1* | 10/2011 | Sakakibara | ................ | A63F 13/213 |
| | | | | 463/31 |
| 2012/0128201 A1* | 5/2012 | Brickhill | ................ | G06K 9/00355 |
| | | | | 382/103 |
| 2012/0204116 A1 | 8/2012 | Patil et al. | | |
| 2012/0313865 A1* | 12/2012 | Pearce | ................ | G06F 3/0416 |
| | | | | 345/173 |
| 2012/0319972 A1 | 12/2012 | Tse et al. | | |
| 2013/0227433 A1* | 8/2013 | Doray | ................ | G06F 3/0482 |
| | | | | 715/753 |
| 2013/0257734 A1* | 10/2013 | Marti | ................ | G06F 1/1686 |
| | | | | 345/168 |
| 2013/0257748 A1 | 10/2013 | Ambrus et al. | | |
| 2013/0260884 A1 | 10/2013 | Challinor et al. | | |
| 2013/0322709 A1* | 12/2013 | Irani | ................ | G06K 9/00013 |
| | | | | 382/124 |
| 2014/0089849 A1* | 3/2014 | Choi | ................ | G06F 3/017 |
| | | | | 715/810 |
| 2014/0184519 A1* | 7/2014 | Benchenaa | ................ | G06F 3/0488 |
| | | | | 345/173 |
| 2014/0267044 A1* | 9/2014 | Andersen | ................ | G06F 3/04886 |
| | | | | 345/168 |
| 2014/0282278 A1* | 9/2014 | Anderson | ................ | G06F 3/017 |
| | | | | 715/863 |
| 2014/0298269 A1* | 10/2014 | Underkoffler | ................ | G06F 3/017 |
| | | | | 715/848 |
| 2014/0335916 A1* | 11/2014 | Thorson | ................ | G06F 1/1626 |
| | | | | 455/566 |
| 2014/0368463 A1* | 12/2014 | Raynor | ................ | G06F 3/0416 |
| | | | | 345/174 |
| 2015/0077326 A1* | 3/2015 | Kramer | ................ | G06F 3/0325 |
| | | | | 345/156 |
| 2015/0103032 A1* | 4/2015 | Bell | ................ | G06F 3/044 |
| | | | | 345/174 |
| 2015/0279019 A1* | 10/2015 | Hsin | ................ | G06F 3/017 |
| | | | | 348/77 |
| 2016/0018960 A1* | 1/2016 | Feng | ................ | G06F 3/04883 |
| | | | | 715/763 |
| 2016/0054807 A1* | 2/2016 | Flagg | ................ | G06F 3/017 |
| | | | | 345/158 |
| 2016/0329006 A1* | 11/2016 | Weber | ................ | G06F 3/011 |

OTHER PUBLICATIONS

Response filed Mar. 29, 2017 to the Communication pursuant to Rules 161(1) and 162 EPC dated Oct. 5, 2016 from European Patent Application No. 15705166.5, 28 pages.

International Search Report and Written Opinion dated Jul. 30, 2015 from PCT Patent Application No. PCT/US2015/014125, 20 pages.

Chen et al., "Device Control," U.S. Appl. No. 61/944,917, filed Feb. 26, 2014, 31 pages.

Annett et al., "Medusa," Proceedings of the 24th Annual ACM Symposium on User Interface Software and Technology, Oct. 16-19, 2011, Santa Barbara, CA, ACM, New York, NY, Oct. 16, 2011, pp. 337-346, 10 pages.

Drader et al., "Time-of-flight measurements open up user-interaction scenarios," EE Times, Jul. 5, 2013, 4 pages.

Murugappan et al., "Extended Multitouch:Recovering Touch Posture and Differentiating Users using a Depth Camera," Proceedings of the 25th Annual ACM Syposium on User Interface Software and Technology, UIST '12, 2012, 10 pages.

Wang et al., "Depth sensor assisted real-time gesture recognition for inteactive presentation," Journal of Visual Communication and Image Representation, vol. 24, No. 8, 2013, pp. 1458-1468, 11 pages.

Jing et al., "Human-computer Interaction using Pointing Gesture based on an Adaptive Virtual Touch Screen", In International Journal of Signal Processing, Image Processing and Pattern Recognition, vol. 6, No. 4, Aug. 8, 2013, pp. 81-92.

Bragdon et al., "Code Space: Touch + Air Gesture Hybrid Interactions for Supporting Developer Meeting", In Proceedings of ACM International Conference on Interactive Tabletops and Surfaces, Nov. 13, 2011, pp. 212-221.

Bossuyt et al., "Combining Touch & Mid-Air Gestures on Public Displays", In Doctoral Dissertation Master's Thesis, Nov. 7, 2012, 65 pages.

Farhadi-Niaki Farzin, "Depth Sensitive Vision-Based Human-Computer Interaction Using Natural Arm/Finger Gestures: An Empirical Investigation", In Thesis of Faculty of Graduate and Post Doctoral Affairs, Dec. 2011, 154 pages.

Caputo et al., "3D Hand Gesture Recognition Based on Sensor Fusion of Commodity Hardware", In Proceedings of Mensch & Computer, Sep. 9, 2012, pp. 1-10.

Vogel et al., "Distant Freehand Pointing and Clicking on Very Large, High Resolution Displays", In Proceedings of 18th Annual ACM Symposium on User Interface Software and Technology, Oct. 23, 2005, pp. 33-42.

International Preliminary Report on Patentability dated Sep. 9, 2016 from PCT Patent Application No. PCT/US2015/014125, 13 pages.

\* cited by examiner

INSTANCE FIFTEEN

INSTANCE SIXTEEN

FIG. 5

INSTANCE SEVENTEEN

INSTANCE EIGHTEEN

FIG. 6    INSTANCE NINETEEN

DEVICE CONTROL

BACKGROUND

The description relates to interacting with and/or controlling display devices.

BRIEF DESCRIPTION OF THE DRAWINGS

The accompanying drawings illustrate implementations of the concepts conveyed in the present document. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the FIG. and associated discussion where the reference number is first introduced.

DETAILED DESCRIPTION

Overview

The description relates to interactions with a display device, such as a digital whiteboard, tablet, smart phone, etc. The present concepts can combine vision and touch techniques to allow a user to more effectively interact with the display device. These combined vision and touch techniques can be referred to as 'VTouch' for sake of brevity. In one form, VTouch can be thought of as a framework to use vision techniques (such as human recognition and hand gesture recognition) to enhance the touch experience on a display. VTouch can recognize users and understand the users' intention before touching the display. As a result, the interaction with a display can be significantly simplified by integrating the vision-based recognition with touch. Thus, Vtouch can provide improved interaction between the user and the device (e.g., it is easier and/or more intuitive for the user to control the device than with existing technologies).

VTouch can use sensors, such as a red, green, blue+depth camera (RGBD) in coordination with the display to capture color, depth, and/or skeleton information (e.g., parameters) of the user. VTouch can apply human recognition algorithms and hand gesture recognition algorithms to identify the user as well as the users' hand gesture. VTouch can also include a simple tool to calibrate the display with the RGBD camera. Therefore, the user's joint position can be easily transformed into a coordinate system of the display.

There are existing technologies relating to human recognition and hand gesture recognition, using hand gesture recognition for remote interaction, using hand gesture to replace the touch gesture, etc. At least some of the inventive concepts are different from these related technologies by trying to improve the user interaction from a different perspective. The present concepts can integrate vision-based algorithms with touch to enhance the interaction on the display. Even though touch is powerful for interaction, using touch only cannot provide fully natural interaction. With the help of vision techniques, the present implementations can provide complements for touch (e.g. which user is touching and with which hand and relative to which command gesture). The present implementations can also allow more intuitive interaction based on hand based command gestures before the touch (e.g. enable keyboard for typing before touch). Therefore, VTouch can provide a better way to interact with a display (e.g., provide more effective user control of the display/device).

Scenario Examples

FIGS. 1-6 collectively show example VTouch scenarios involving a device 100 and a user 102. In this case, the device 100 is manifest as a relatively large touch display having a graphical user interface (GUI) 104 presented thereon. In this case, assume that the large touch display can be configured for mounting on a wall or other vertical surface (not specifically shown in FIG. 1, but can be evidenced in FIG. 8) and/or employed in other ways.

Figure 1:
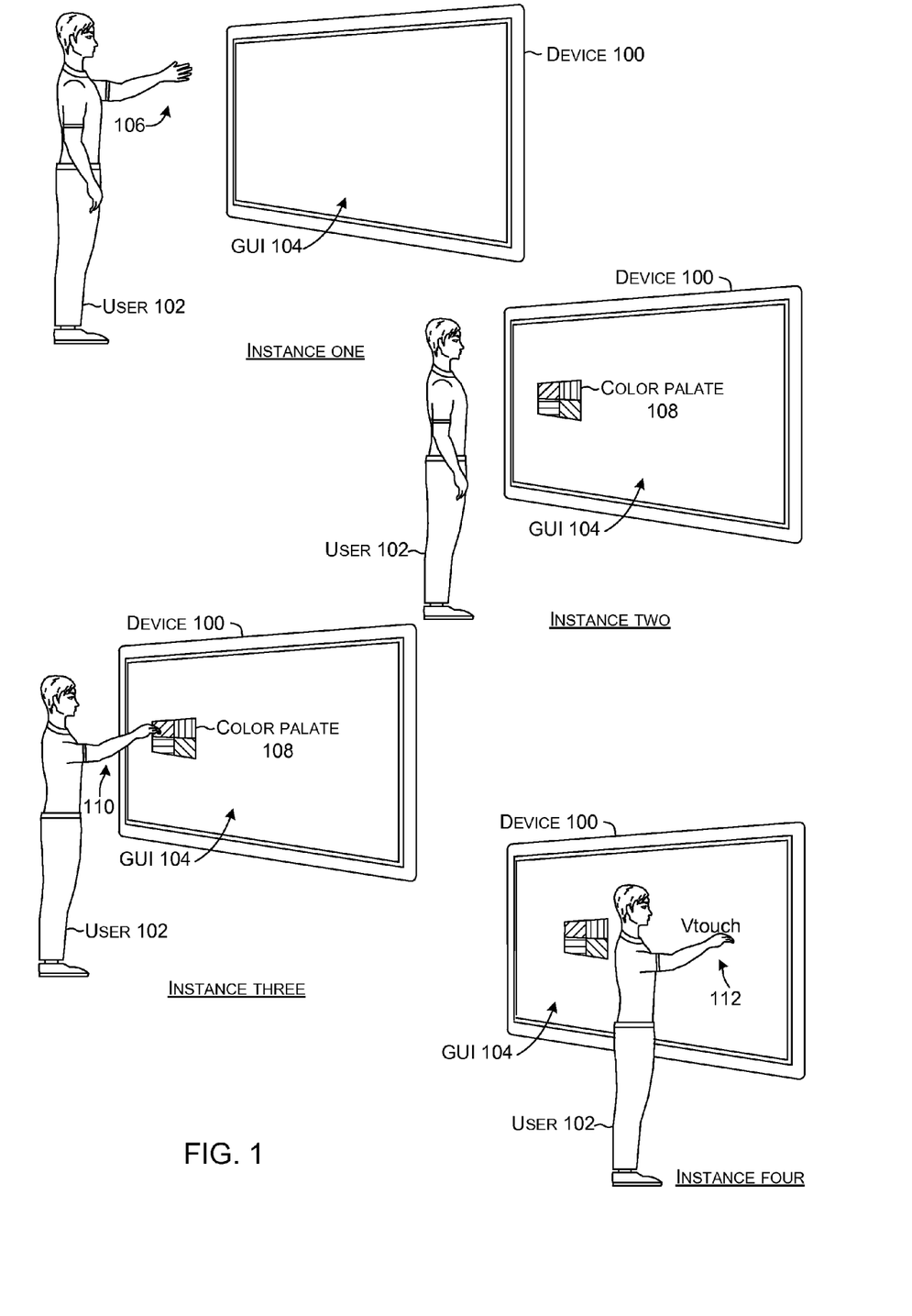
FIGS. 1-6 show views of example devices and example device interaction scenarios in accordance with some implementations of the present concepts.

FIG. 1 shows a first scenario where at Instance One the user performs a non-touch command gesture with his left hand as indicated generally at 106. In this case, the command gesture involves the user holding his left hand in front of him in a manner that artists traditionally hold a color palette (e.g., palm facing right and left fingers spread). The command gesture can be utilized to control or alter the GUI. In this case, the command gesture can cause a menu to be presented. In this example, at Instance Two the menu is manifest as a color or control palette 108. (Note that the colors are represented by patterns in the drawing). In Instance Three, the user can engage the color palette (e.g., touch the color palette) with his right hand to select an option (e.g., color) from the color palette as indicated at 110. Instance Four shows the user writing on the display with the selected color with his right hand at 112. In an alternative configuration, selection from the color palette 108 could be performed with the left hand while the user writes with the right hand. Thus, the user could change colors as he writes.

Stated another way, users can use the 'palette holding' gesture (by opening hand perpendicular to the screen) to launch the color palette 108, which can then be shown close to the hand. Users can create their own control gesture profile. For instance, the user can choose colors presented on the color palette and/or width of color application (or eraser) for both hands and pen. VTouch can recognize and distinguish users from one another. As such, Vtouch can store the user information in a user profile for future recall when the user is subsequently identified.

In summary, FIG. 1 illustrates that Vtouch can distinguish between the user's left hand and the right hand. Thus, gestures performed with the left hand can be assigned different meanings than the same gesture performed by the right hand. Further, Vtouch can store information about individual users, such as handedness. Thus, when a particular user is identified Vtouch may recall that the user is right handed and uses the left hand to perform gestures to invoke command options (e.g., the color palette) and then uses the right hand to implement the option (e.g., write on the board). Vtouch can also distinguish whether the user is touching the display when he performs a gesture or is spaced apart from the display. Each of these aspects can be treated as a parameter that is considered by VTouch to interpret the user's intent and thus allow much more robust user control and user engagement scenarios than were previously possible. Of course, other manifestations of the user controlling the GUI 104 besides those illustrated in FIG. 1 are contemplated. Other examples are described below.

Figure 2:
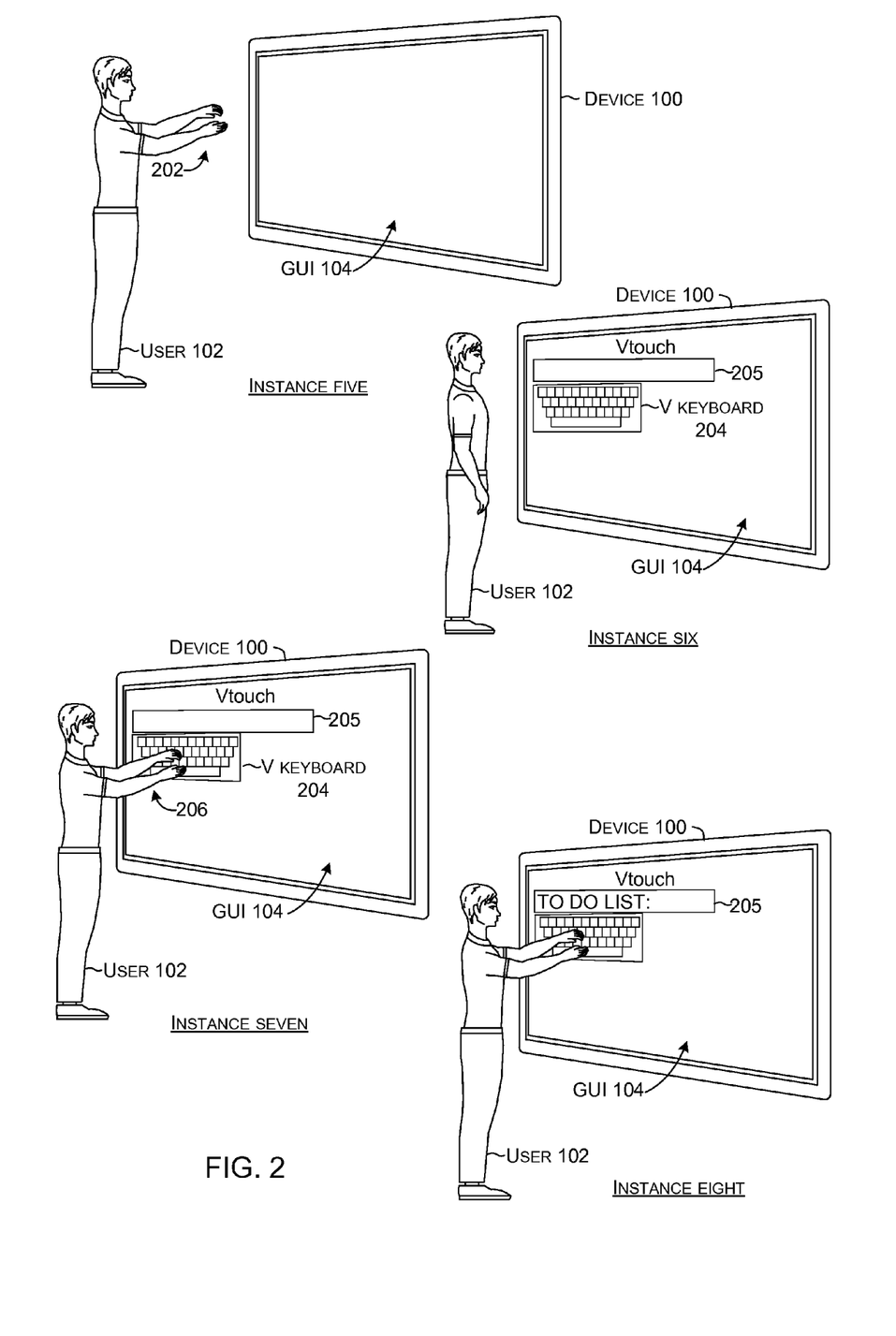

FIG. 2 shows another scenario for the user 102 to control the GUI 104. At Instance Five the user can perform a 'typing gesture' in front of the device 100 as indicated generally at 202. Responsively, Vtouch can cause a virtual keyboard 204 and text box 205 to be presented on the device 100 at Instance Six. Instance Seven shows the user 102 typing on the virtual keyboard 204 at 206 to generate the words 'To do list:' shown in Instance Eight in the text box 205. Also, in this implementation, a visual indication can be provided to the user that Vtouch has detected the user and is interpreting the user's gestures. In this particular case, the word 'Vtouch' is displayed on the GUI 104 so that the user knows that the user has invoked the Vtouch system and that it is monitoring the user and acting on the user's behalf to control the device.

Further, note that in this implementation, Vtouch adapts the GUI 104 to the user rather than the user adapting to the GUI. For instance, Vtouch presents the virtual keyboard 204 and the user's text (e.g., text box 205) where the user preforms the keyboard launch gesture (e.g., beneath the user's hands) rather than in a predefined location on the GUI 104. Stated another way, Vtouch can sense the location of the user and the location where the user performs an individual gesture and Vtouch can control the GUI based upon the sensed gesture and the sensed location.

Vtouch implementations can offer additional advantages in scenarios involving multiple users. For instance, because of the Vtouch user identification and identification of which user is performing which gesture, each hand drawing/writing stroke and/or typed word on the GUI has a known authorship. This configuration can allow additional functionality. For instance, each user can have an icon on the GUI and the user can cause his/her content to be highlighted (or otherwise distinguished from other user's (or users') content by touching his/her icon.

Figure 3:
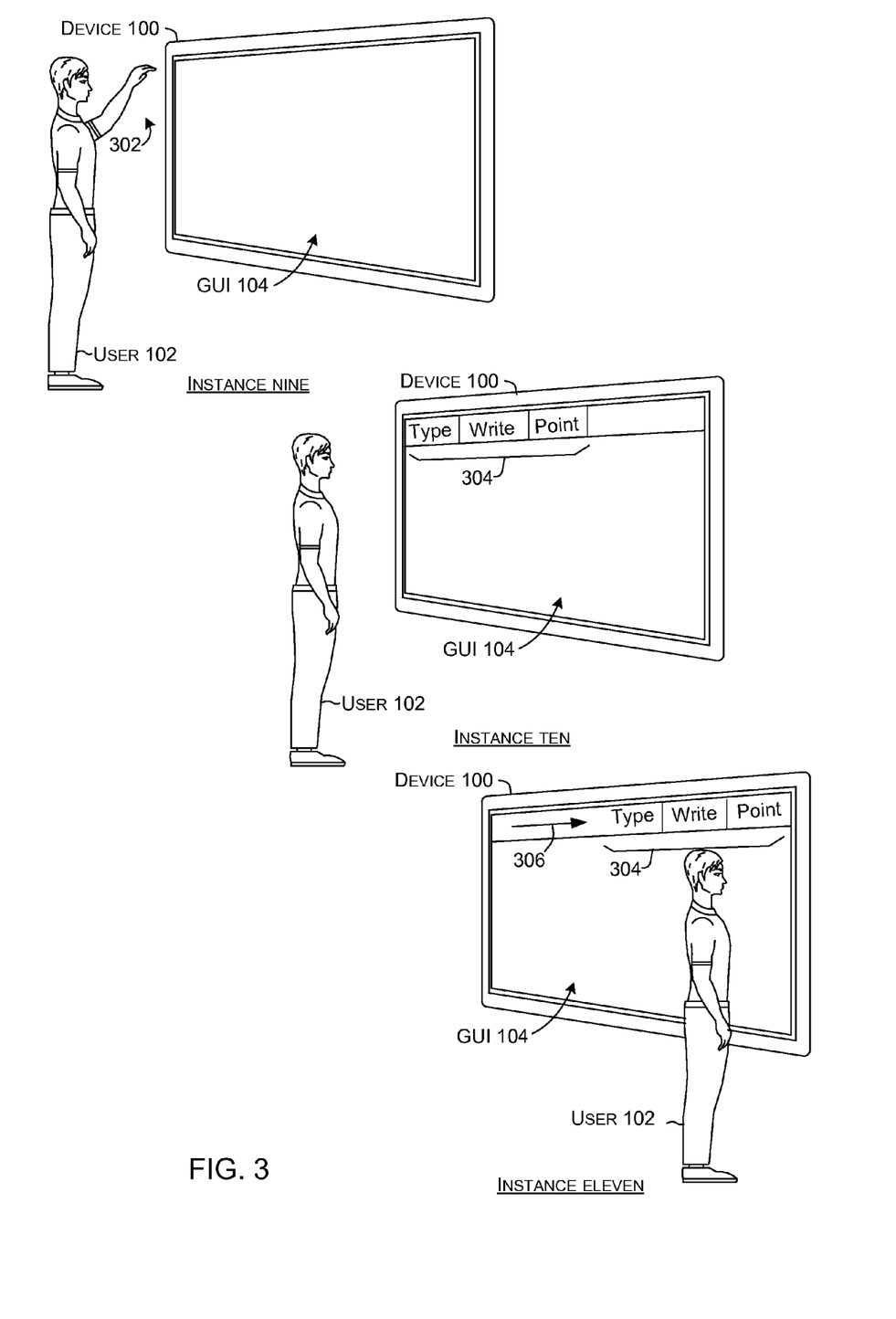

FIG. 3 shows another scenario. At Instance Nine the user 102 can perform a gesture of waving his hand over the top of the device 100 as indicated generally at 302. Responsively, Vtouch can cause a toolbar ribbon 304 to be presented across the top of the GUI 104 at Instance Ten. Instance Eleven shows that Vtouch can track the user's movement (e.g., to the right) and move the toolbar ribbon 304 with the user as indicated generally at 306. In summary, users can utilize the 'above the board' gesture (by moving one hand above the device) to enable the top menu (e.g., toolbar ribbon 304). The buttons on the top menu can move with the user when the user moves left or right. Similarly, the toolbar ribbon, or a different menu, can be invoked by the user reaching his hand along the bottom of the device and/or by the user performing an alternative gesture.

Figure 4:
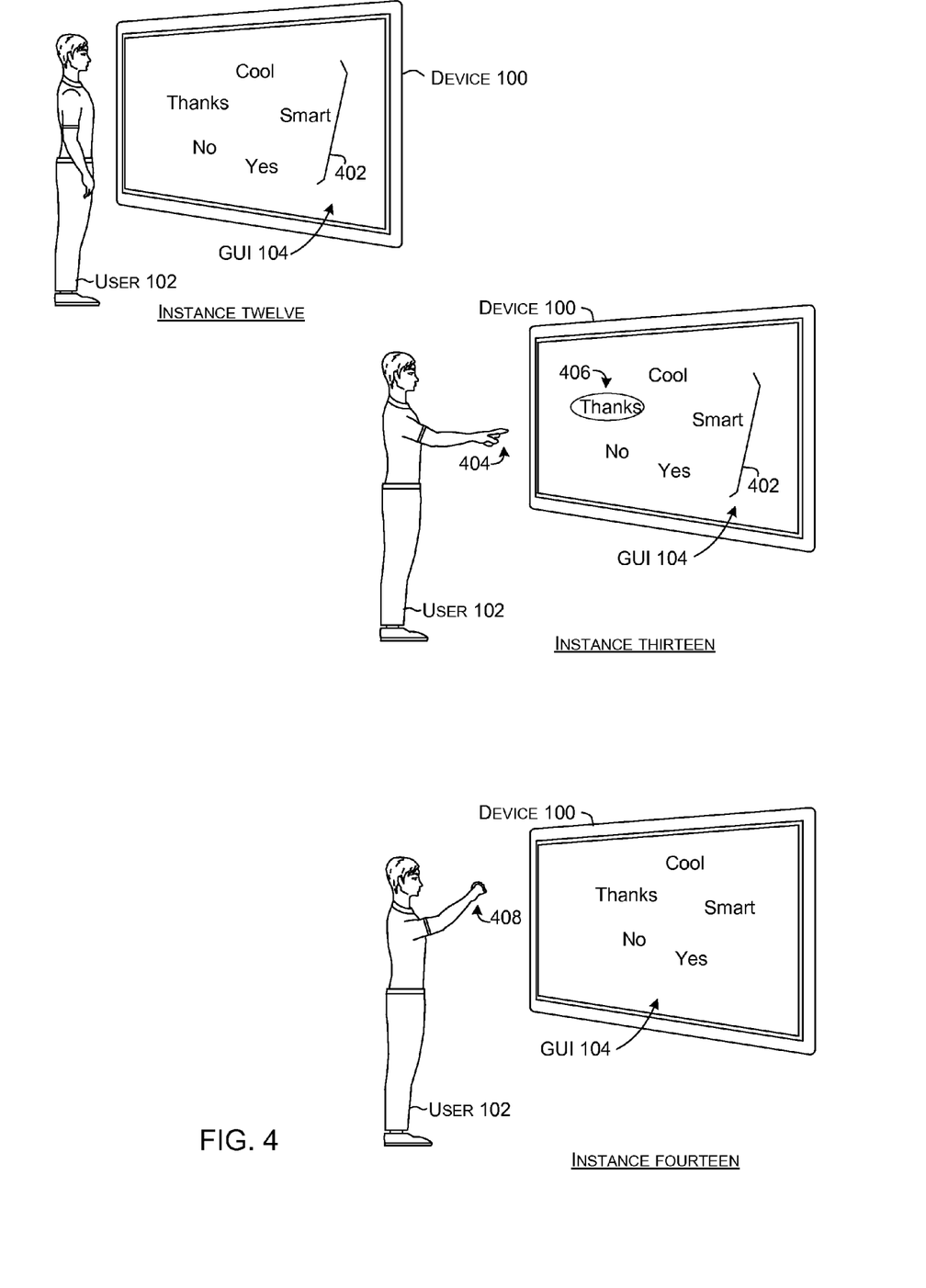

FIG. 4 shows another use case scenario. Instance Twelve shows a set of terms 402 on the GUI 104 of the device 100. Instance Thirteen shows Vtouch can detect a user's gesture 404 of pointing at an individual term 406 with a finger to select the term (in this case the term 'thanks'). Instance Fourteen shows the user making a first in front of the display as indicated at 408. Vtouch can distinguish the pointing gesture 404 of Instance Thirteen from the first gesture 408 of Instance Fourteen and does not treat this (e.g., the first) gesture as a selection gesture (e.g., no terms selected).

In summary, the pointing gesture can allow the user 102 to highlight or select content on the device 100 by pointing to the content. This can replace the laser pointer in a presentation with a more intuitive pointing gesture.

While not illustrated, another functionality offered by Vtouch can be automatically adjusting the background intensity of the GUI 104 based on the distance between the user 102 and the device 100. For instance, the GUI can be turned darker when the user is closer, making the users' eyes more comfortable.

Further, by sensing a region in front of the device, Vtouch knows when individual users leave the sensed region. When an individual user leaves the region, Vtouch can automatically lock the GUI 104 and/or take other actions to protect the content for privacy. If someone subsequently enters the space and Vtouch recognizes him/her as the user who created the content, Vtouch can automatically unlock the GUI so the user can continue his/her work. Of course, alternative implementations of user identification and content protection are contemplated.

Figure 5:
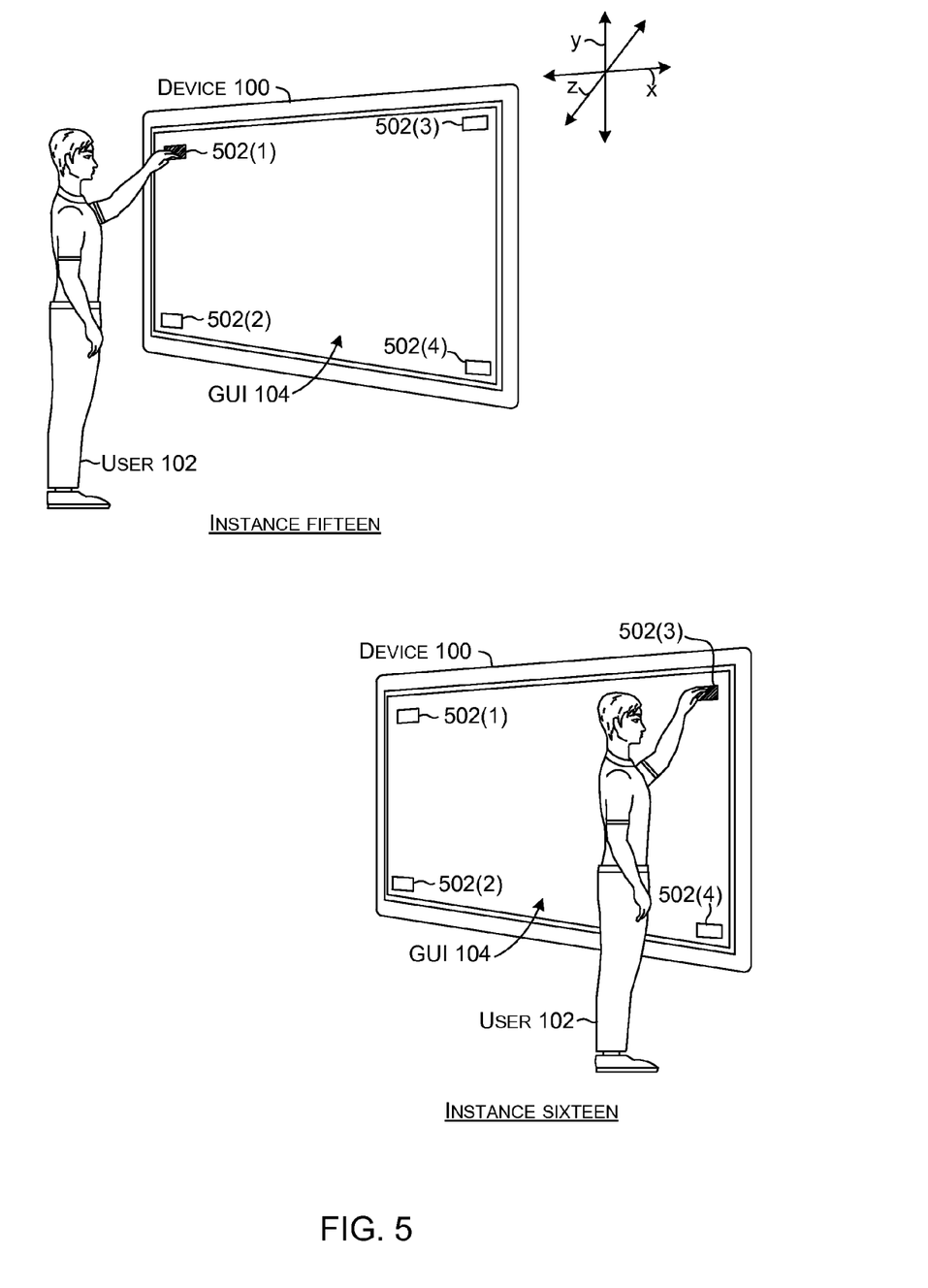

FIG. 5 shows an example Vtouch calibration example. In this case, Vtouch can populate a user recognizable shape or symbol proximate to each corner of the GUI 104. In this case, the user recognizable shapes are manifest as rectangles 502(1)-502(4). The user 102 can sequentially touch the symbols (the user is shown touching two of the four shapes) in Instances Fifteen and Sixteen to calibrate Vtouch sensors to the display (e.g., the GUI 104 presented on the device 100) and the user 102. Stated another way, the Vtouch sensors can capture images of the GUI. When the user touches individual rectangles, the 3D location of the user's hand at that instant in time can be mapped to the coordinates of the individual rectangle on the GUI. Of course, other calibration techniques are contemplated.

Figure 6:
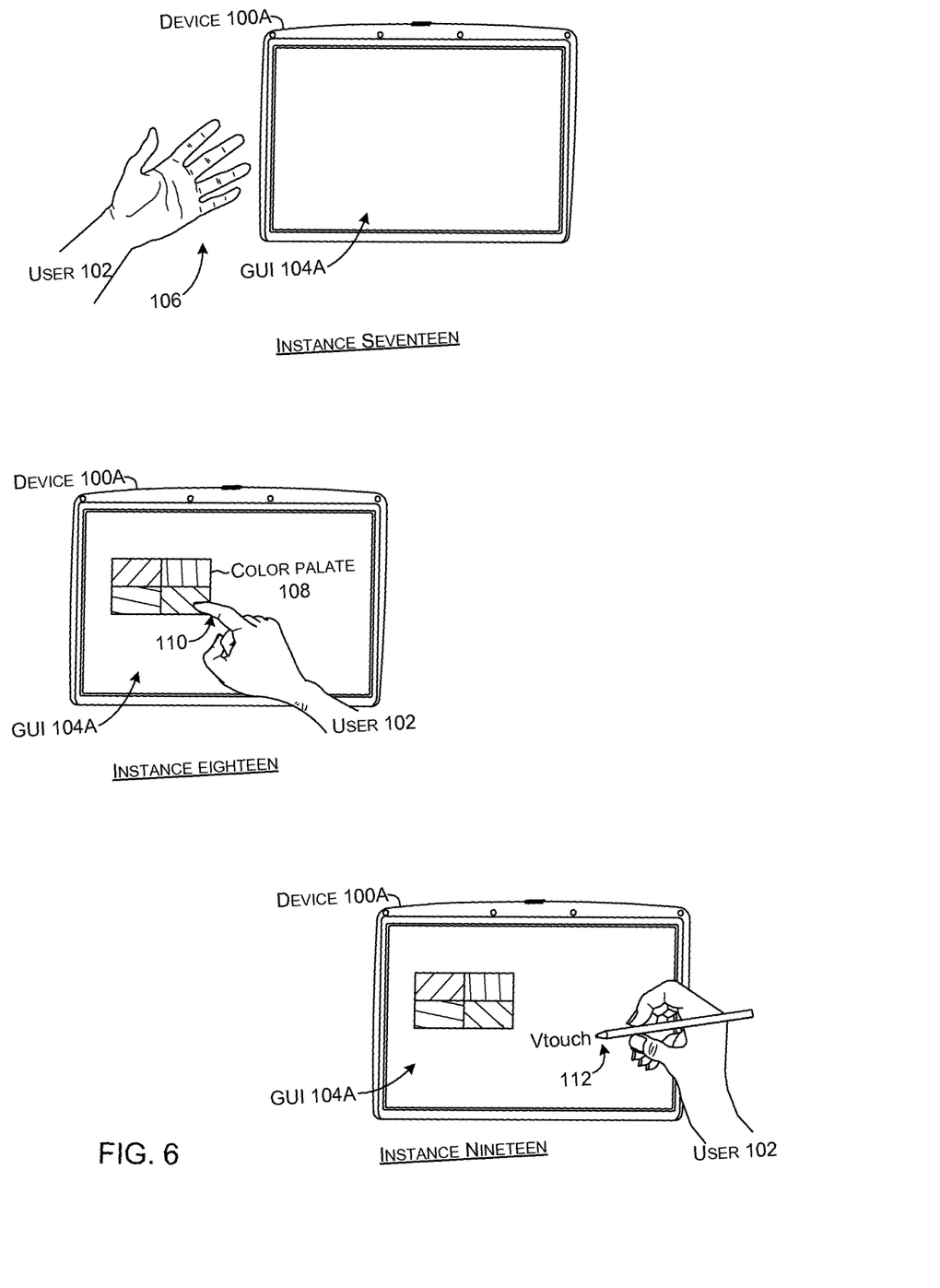

FIG. 6 shows another scenario similar to FIG. 1 except that in this case Vtouch is implemented on a touch sensitive tablet type device or pad type device 100A. In this example, the user 102 performs the palette gesture 106 with the left hand at Instance Seventeen to cause Vtouch to launch the color palette 108. Instance Eighteen shows the user selecting a color from the color palette with his right finger as indicated at 110. Instance Nineteen shows the user writing 'Vtouch' at 112 with a stylus or digital pen on the tablet using the color selected with the right finger in Instance Eighteen from the palette launched with the left hand gesture in Instance Seventeen.

Note that while a single user is shown for sake of brevity, the present concepts are applicable to multiple simultaneous and/or serial users of a single device. Note further that while specific gesture scenarios are described above, the present implementations lend themselves to nearly limitless other gesture scenarios.

Example System

Figure 7:
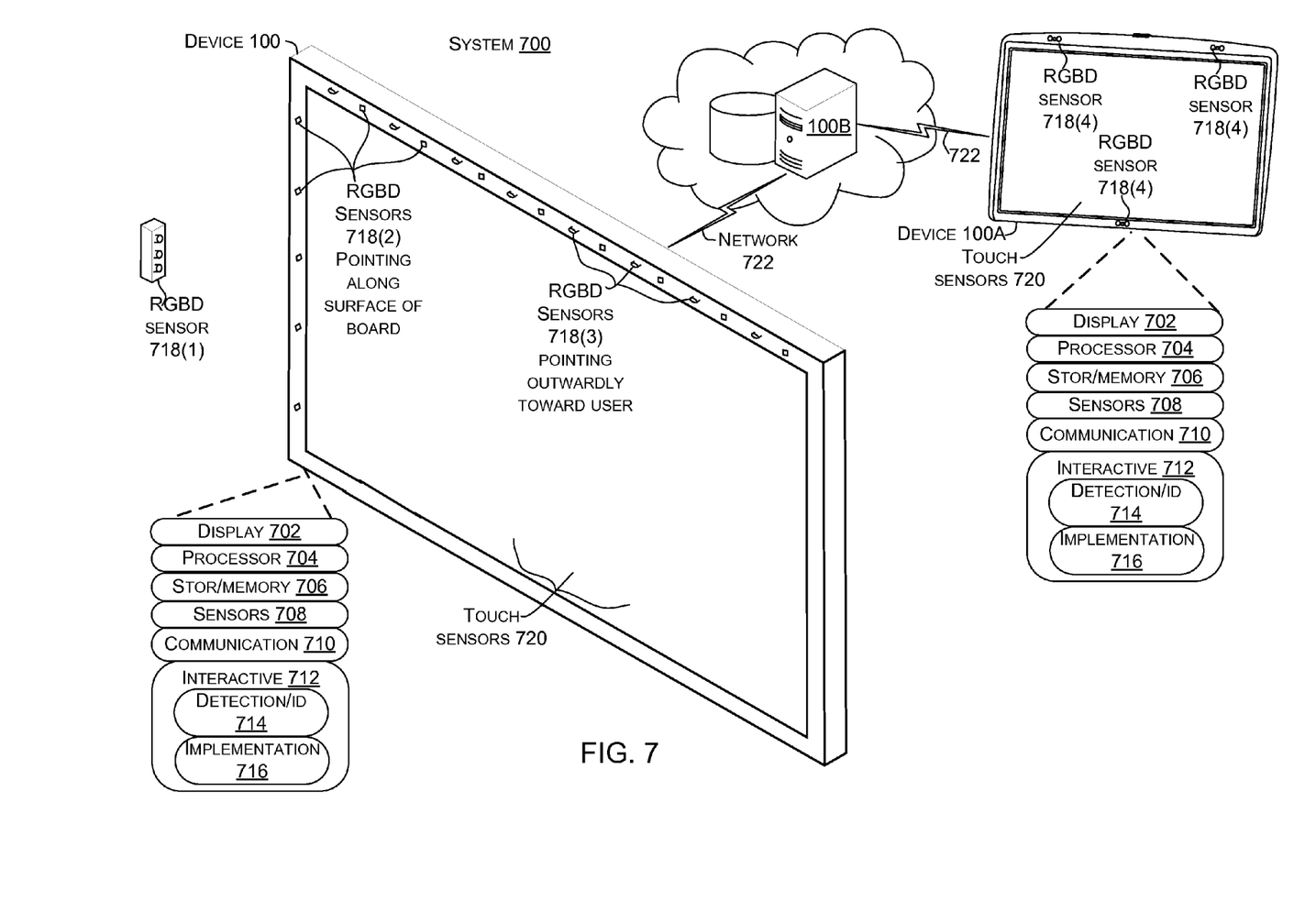
FIGS. 7-8 show example systems for implementing device interaction scenarios in accordance with some implementations of the present concepts.

FIG. 7 shows one Vtouch implementation on a system 700. The system illustrates two device configurations. The first device 100 was introduced relative to FIG. 1 and is a large display device and the second device 100A was introduced relative to FIG. 6 and is a tablet type device. Of course, other devices can be configured to accomplish Vtouch concepts. Both of these devices can include a display 702, a processor 704, storage/memory 706, sensors 708, a communication component 710, and an interactive component 712. The interactive component 712 can include a detection/identification module 714 and an implementation module 716. The device can alternatively or additionally include other elements, such as buses, graphics cards (e.g., graphics processing units (CPUs), network hardware), etc., which are not illustrated or discussed here for sake of brevity.

Various types of sensors are contemplated. Two types of sensors that are discussed with particularity are depth sensors, which in this case are manifest as red, green, blue+depth (RGBD) sensors 718 and touch sensors 720 associated with display 702. Touch sensors 720 can be pressure sensors configured to detect physical touch, capacitance sensors configured to detect proximity, and/or other types of sensors. The RGBD sensors 718 can be employed in various ways, such as pointing toward the display 702 (see for example 718(1) and 718(2)) and pointing way from the display (see for example, 718(3)). RGBD sensors 718(4) on device 100A can be wide angle sensors that can both sense proximate to the display 702 and in front of the display.

Figure 8:
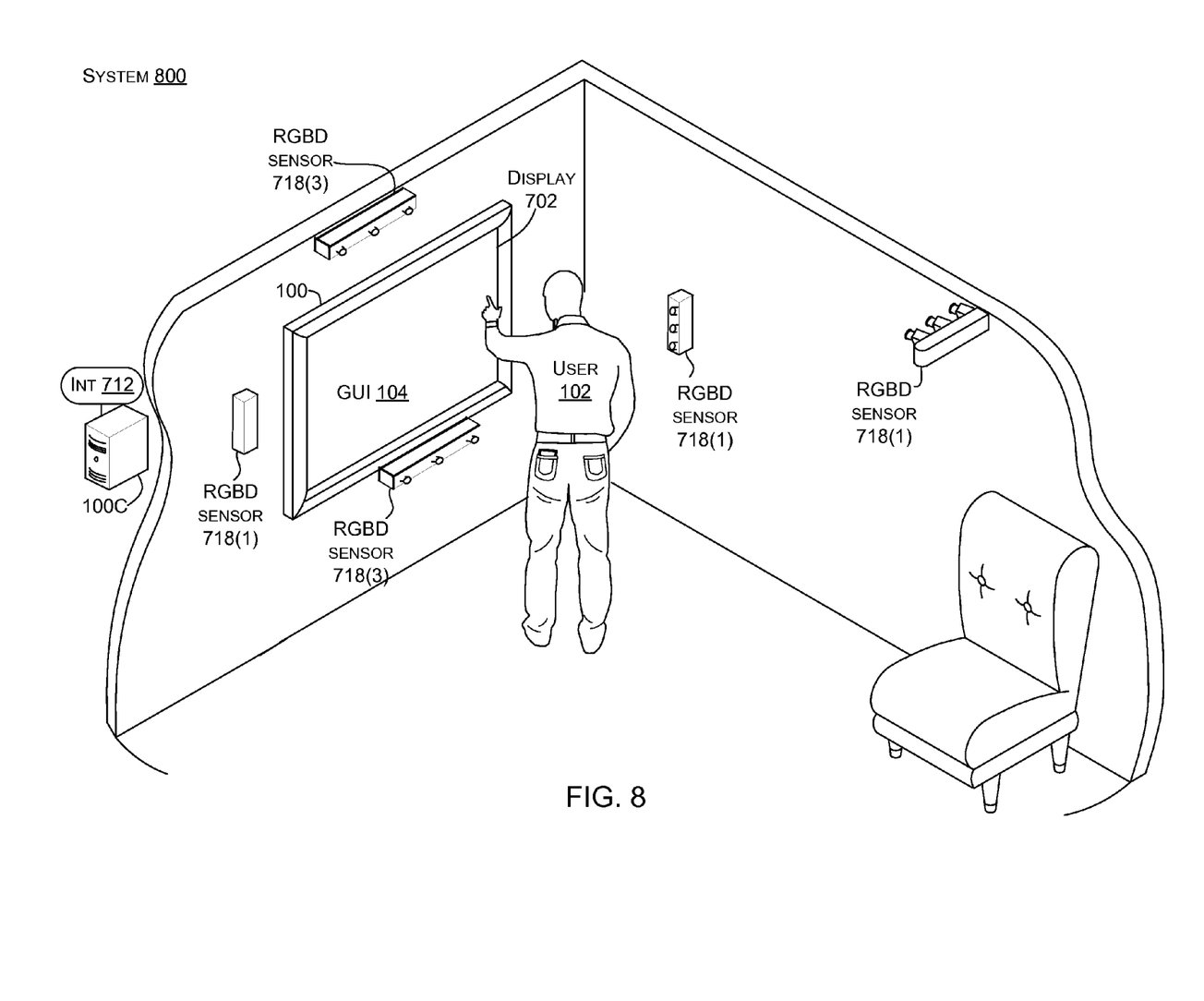

In the illustrated configuration, the display 702 can be a touch sensitive display. Other configurations can use a combination of sensors to mimic a touch sensitive display on a non-touch sensitive display (one such example is shown in FIG. 8). For instance, sensors 708 can be utilized to detect user commands proximate to the display 702 to create the impression of a touch display functionality on a non-touch sensitive display. Note further, that the present implementations are not limited to a specific type of display. In contrast, workable implementations can be accomplished with projection displays, light emitting diode (LED) displays, liquid crystal displays, electroluminescent displays, plasma displays, and/or other developing or yet to be developed display types. GUIs 104 and 104A discussed relative to FIGS. 1-6 can be presented on the display 702 as controlled by processor 704.

In the illustrated configuration, the tablet device 100A includes touch sensitive display 702 and three sets of RGBD sensors 718(4) (such as such as Kinect® brand depth cameras offered by Microsoft® Corp. or Intel's RealSense 3D camera, among others) integrated into the housing to detect users and user gestures/interactions with the device.

As mentioned above, in the illustrated configuration, the large display device 100 can utilize a combination of sensors 708, some of which (such as touch sensors 720 and RGBD sensors 718(2) and 718(3)) are integrated into the display housing and some of which, such as RGBD sensors 718(1), are external to and separate from the display 702. Other configurations may use a display, such as a touch sensitive display coupled with one or more sensors, such as RGBD sensors to detect the user and user commands. In the case of device 100, RGBD sensors 718(3) can be a set of sensors configured to sense an area in front of display 702. RGBD sensors 718(1) and/or 718(2) can be another set of sensors configured to sense proximate to the surface of the display 702 (e.g., to sense user interactions with a surface of the display).

From one perspective, the devices 100 and 100A can be thought of as computers that have some amount of processing and/or storage capacity. In other cases, the devices may be coupled to computers that provide these resources. The processor can execute data in the form of computer-readable instructions to provide a functionality. Data, such as computer-readable instructions and/or user-related data, can be stored on storage, such as storage that can be internal or external to the computer. The storage can include any one or more of volatile or non-volatile memory, hard drives, flash storage devices, and/or optical storage devices (e.g., CDs, DVDs etc.), among others. As used herein, the term "computer-readable media" can include signals. In contrast, the term "computer-readable storage media" (e.g., storage/memory 706) excludes signals. Computer-readable storage media includes "computer-readable storage devices." Examples of computer-readable storage devices include volatile storage media, such as RAM, and non-volatile storage media, such as hard drives, optical discs, and flash memory, among others.

In some configurations, devices can include a system on a chip (SOC) type design. In such a case, functionality provided by the computer can be integrated on a single SOC or multiple coupled SOCs. One or more processors can be configured to coordinate with shared resources, such as memory, storage, etc., and/or one or more dedicated resources, such as hardware blocks configured to perform certain specific functionality. Thus, the term "processor" as used herein can also refer to central processing units (CPUs), graphical processing units (CPUs), controllers, microcontrollers, processor cores, or other types of processing devices suitable for implementation both in conventional computing architectures as well as SOC designs.

Examples of other computers can include traditional computing devices, such as personal computers, desktop computers, notebook computers, cell phones, smart phones, personal digital assistants, pad or tablet type computers, cameras, large display devices, projection devices, or any of a myriad of ever-evolving or yet to be developed types of computing devices. In some cases, the display device can include computer elements, and thus be thought of as a computer. In other cases, the display device can communicate with and be controlled by a computing device.

Some of the sensors 708, such as RGBD sensors 718, can be configured to detect 3D images. Various technologies can be utilized for the depth aspect. For instance, non-visible spectral patterning can be used, time of flight can be used, and/or stereo cameras can be used. In one implementation, the sensors can be manifest as depth cameras, such as Kinect depth cameras offered by Microsoft Corp. or Intel's RealSense 3D camera, among others.

The communication component 710 can facilitate sending and receiving data over a network(s) 722 between elements of the device and/or with other devices. The communication component can be manifest as one or more of Ethernet ports, USB ports, HDMI ports, Wi-Fi hardware, and/or cellular hardware, among others.

The Vtouch's detection/identification module 714 can analyze information from the sensors 708 to attempt to identify which user is interacting with the display 702 and which gestures the user is performing with which body part. The implementation module 716 can identify what the identified gestures mean. For instance, the implementation module 716 can access a dataset that maps gestures to commands. The dataset can be fixed or can be customized for/by individual users. For instance, the dataset can indicate whether a user is right or left handed. Further, the dataset may be configured to allow application designers to add gestures and associated commands to the dataset for their particular application. For instance, a designer of a video playing application may want to map a right hand spinning motion to mean 'play' the video. In some implementations, users can define their own gesture and meanings for the dataset. The dataset can be maintained on the device 100 on the storage/memory 706 and/or remotely, such as on remote device 100B. For instance, the remote device 100B can be manifest as a cloud-based server.

The detection/identification module 714, via the sensors 708, can obtain and analyze biometric data/parameters, such as skeletal data, (such as arm length, finger length, arm orientation and finger orientation, and/or joint position, among others), video data, depth data, and/or stroke data. The color and depth data can allow the detection/identification module 714 to extract an image and 3D point cloud of the user, while the skeletal data can allow the detection/identification module to track the positions of the limbs of the user. The depth data and skeletal data can be expressed in the coordinate system of the capturing sensor 708 (e.g., RGBD sensor 718). In order to understand the relation of the user to the display 702, the detection/identification module 714 can transform the data from the sensor's 708 (e.g., camera's) coordinate system into the display's 702 coordinate system. In some implementations, this can leverage prior calibration of the user, sensors and display (see for example, FIG. 5).

The calibration system illustrated in FIG. 5 can allow a user to tap four points in the corners of the device. When the user taps a point, the system records his 3D hand position from the skeletal information. From these four 3D positions, the detection/identification module can calculate a matrix relating the coordinate systems of the sensor, such as RGBD sensor 718 and the display 702.

Once the data are transformed into the display's coordinate system, it can be processed and rendered with different visualizations (to be described in the next section under the heading "Vtouch Conditions"). Some implementations can use C++ and OpenGL for 2D/3D video processing and rendering.

From one perspective, VTouch can provide a framework to integrate vision based algorithm (e.g. human recognition, such as facial recognition, hand gesture recognition) with touch to enhance the interaction experience, such as on large touch displays. This framework can provide application designers/developers with powerful weapons to access a user's identity, location, and hand gesture, making development of interactive applications on the display easier.

Note that some configurations can entail a self-contained device (e.g., hardware located on the device and processing performed on the device). Some other configurations may perform some aspects remotely. For instance, the device could relay sensor data to a remote computer, such as computer 100B of FIG. 7. The remote computer could process the sensor data to determine user gestures and communicate this information back to the device and/or to other devices. Still other implementations are contemplated.

FIG. 8 shows another example system 800 that can illustrate another example sensor layout relative to device 100. In this case, device 100 is manifest as display 702 that is coupled to a device 100C that can control the GUI 104 presented on the display. In this example, system 800 includes multiple RGBD sensors 718(1) pointing toward the display 100 and multiple different RGBD sensors 718(3). The RGBD sensors 718(1) pointing toward the display can be configured to capture user interactions with the display. The RGBD sensors 718(3) pointing away (e.g., in front of the display) can capture information about the user so that the user can be identified before interacting with the display (e.g., as captured by the RGBD sensors 718(1)). The sensors 718(3) can also capture gestures from the user when the user is spaced apart from the display.

The interactive component 712 can use information from sensors 718(3) (and/or other sensors) to identify/distinguish individual users (e.g., human recognition). The interactive component can provide/assign an identification number or other unique ID to individual users. The interactive component can associate various parameters with the individual user, such as handedness (using skeletal information/parameters provided by the RGBD sensors 718(1)). Thus, the interactive component can offer personalized interaction to individual users. This user information can be stored locally and/or remotely for future use.

The RGBD sensors 718(1) pointing toward the display 702 can be configured to capture user interactions with the display. This configuration can provide visualizations of both the user and the display, making the calibration easy and allowing the interactive component 712 to understand the 3D relationship between the user's body and the display. For instance, the interactive component can use sensors 718(1) and 718(3) to identify the user's hand and finger and the location of the finger. When the user 102 touches the display 702, touch sensors in the display can record the location of the touch on the display. The interactive component 712 can correlate the touch information with simultaneous location information from sensors 718(1) and 718 (3) to calibrate the sensors 718(1) and 718(3) and a location on the display identified by the touch sensors.

Figure 9:
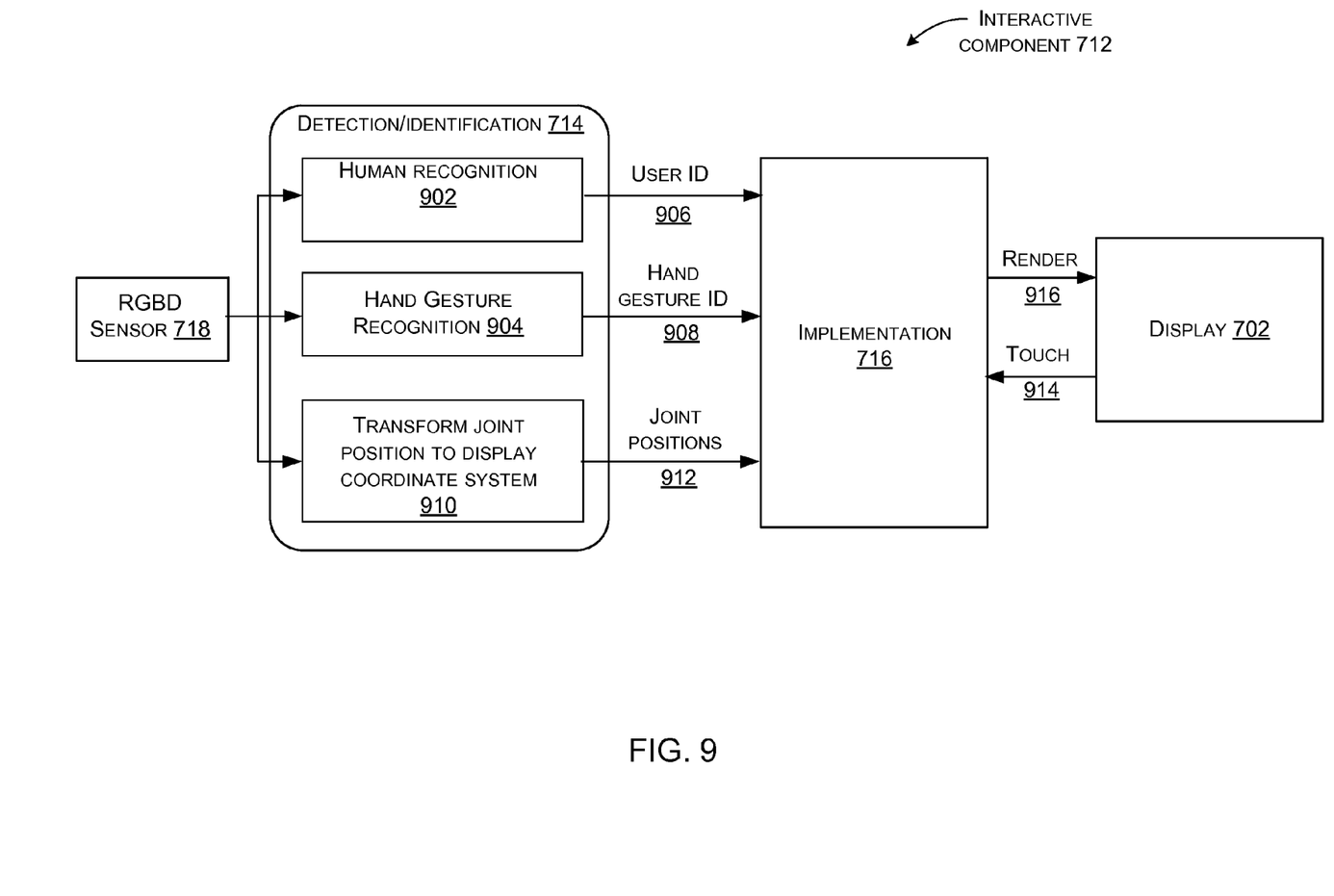
FIG. 9 shows additional details about some of the elements introduced relative to FIGS. 7-8 in accordance with some implementations of the present concepts.

FIG. 9 shows one implementation involving some of the individual elements introduced above relative to FIG. 7. In this implementation the interactive component's detection/identification module 714 can receive sensed input from the sensors (in this case are RGBD sensors 718) to recognize the user (e.g., human recognition 902) and the hand gesture (e.g., hand gesture recognition 904) for one or both hands. The detection/identification module 714 can utilize sensed input to provide the user ID and hand gesture ID for the implementation module 716 at 906 and 908, respectively.

The detection/identification module 714 can also transform joint positions from the sensor coordinates to display coordinates (X towards right, Y towards down, and Z towards into the display) at 910. The resultant joint position information can be sent to the implementation module 716 at 912. Therefore, the interactive component 712 via the detection/identification module 714 and the implementation module 716 can identify the user, understand the user's hand gesture, and know the location of the user and his joints with respect to the display 702. These inputs, together with the touch related input gathered from the display 702 at 914, can allow implementation module 716 to render GUIs at 916 that significantly enhance the user experience for interacting with the display. The implementation module 716 can work on its own or in combination with an application or OS to create GUIs on the display.

Note some implementations that utilize human recognition and hand gesture recognition can benefit from collecting training data and training a gesture classifier of the detection/identification module 714. These same techniques can be utilized to allow the user to 'teach' the system their own gestures and assign a meaning to these gestures.

In summary, the interactive component 712 can provide hand gesture ID (using hand gesture recognition) for each hand before the touch and during the touch, which can significantly enrich the interaction. For example, popup menus and virtual keyboards can be easily enabled by the intuitive hand gesture right before the touch, making the interaction more efficient.

Further, menu items, such as palettes and virtual keyboards can be displayed near the hands of the intended user (who made the gesture) for greater convenience. These menu items can also migrate with the user in some implementations, especially for very large displays. The present concepts can allow subsequent developers and/or the user to create charm gestures to bring up menus without touch.

The interactive component 712 can readily function as part of an operating system or application on the device or the interactive component can readily interface with the operating system or the application(s) to provide enhanced user interaction in various scenarios.

Method Examples

Figure 10:
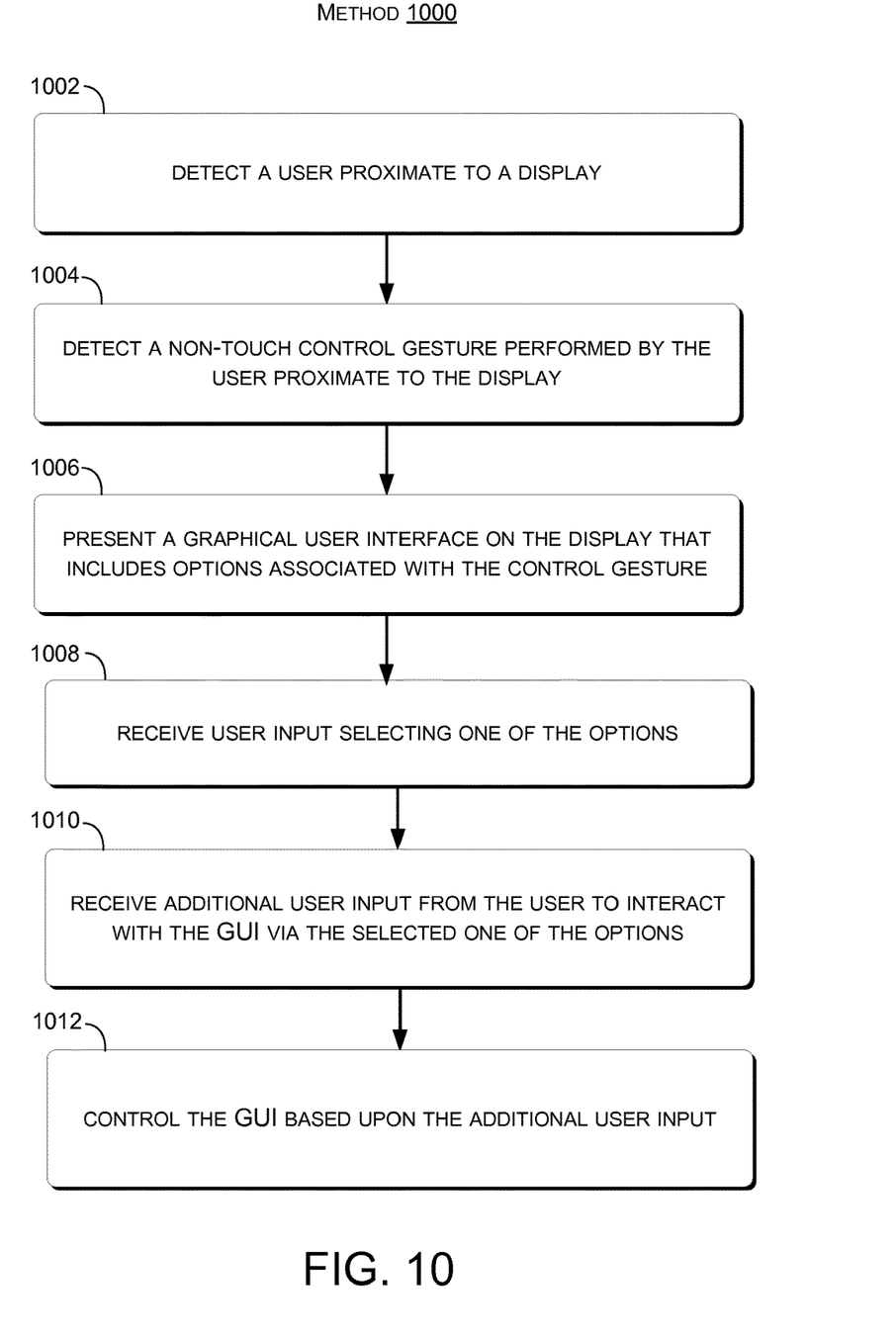
FIGS. 10-11 show example device interaction flowcharts in accordance with some implementations of the present concepts.
Figure 11:
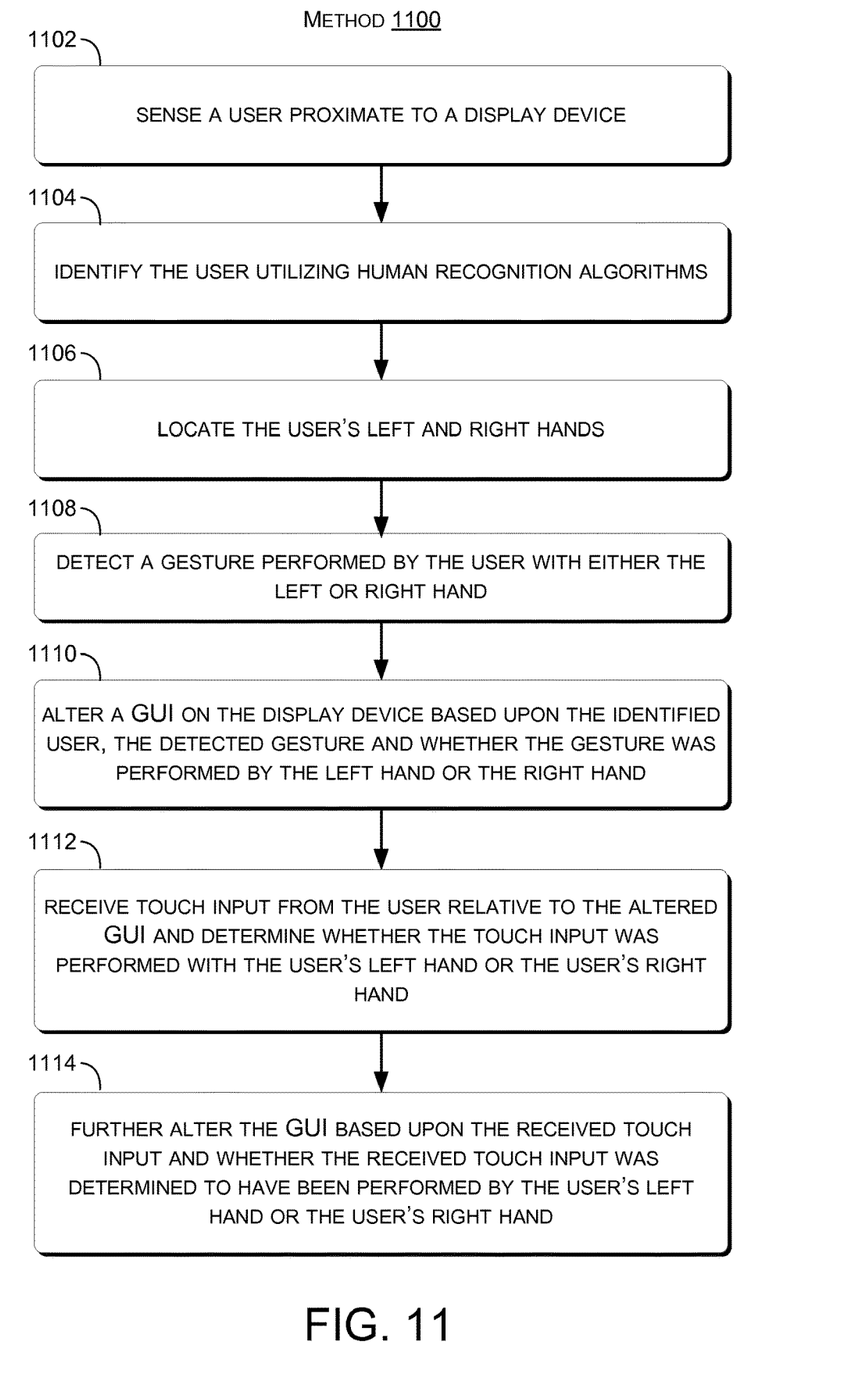

FIGS. 10-11 show example user interaction methods.

Method 1000 can detect a user proximate to a display at 1002. In some cases, the act of detecting the user can also contribute to identifying the user. For instance, parameters sensed as part of the detection, such as facial recognition parameters, skeletal parameters, and/or handedness parameters can be used to distinguish the user from other users. The user can be identified by comparing values of the detected parameters to stored values of these parameters of previously identified users.

The method can detect a non-touch control gesture performed by the user proximate to the display at 1004.

The method can present a graphical user interface (GUI) on the display that includes options associated with the control gesture at 1006.

The method can receive user input selecting one of the options at 1008. For instance, the user could perform the non-touch control gesture with his/her left hand and then perform the selection using the other hand. The user input selection can be a touch gesture or a non-touch gesture.

The method can receive additional user input from the user to interact with the GUI via the selected one of the options at 1010. For instance, the user may start with a non-touch gesture with his/her left hand (e.g., launch color palette), followed by a non-touch selection with the right hand (e.g., select color), followed by touch interaction with the selected element (e.g., paint with selected color).

The method can control the GUI based upon the additional user input at 1012. For instance, the 'painting' performed by the user can appear on the GUI.

Method 1100 can sense a user proximate to a display device at 1102. In some implementations, the sensing can be accomplished with depth cameras, such as RGBD cameras.

The method can identify the user utilizing human recognition algorithms; at least one of the human recognition algorithms relating to sensed skeletal information at 1104.

The method can locate the user's left and right hands from the sensed skeletal information at 1106.

The method can detect a gesture performed by the user with either the left or right hand and identify whether the user performed the gesture with the left hand or the right hand based upon the sensed skeletal information at 1108.

The method can alter a GUI on the display device based upon the identified user, the detected gesture and whether the gesture was performed by the left hand or the right hand at 1110.

The method can receive touch input from the user relative to the altered GUI and determine whether the touch input was performed with the user's left hand or the user's right hand at 1112.

The method can further alter the GUI based upon the received touch input and whether the received touch input was determined to have been performed by the user's left hand or the user's right hand at 1114.

The described methods can be performed by the systems and/or devices described above, and/or by other devices and/or systems. The order in which the methods are described is not intended to be construed as a limitation, and any number of the described acts can be combined in any order to implement the method, or an alternate method. Furthermore, the method can be implemented in any suitable hardware, software, firmware, or combination thereof, such that a device can implement the method. In one case, the method is stored on computer-readable storage media as a set of instructions such that execution by a computing device causes the computing device to perform the method.

Additional Examples

Various examples are described above. Additional examples are described below. One example is manifest as computer-readable storage media having instructions stored thereon that when executed by a processor of a computing device cause the computing device to implement a method. The method can include sensing a user proximate to a display device and identifying the user utilizing human recognition algorithms. At least one of the human recognition algorithms can relate to sensed skeletal information. The method can include locating the user's left and right hands from the sensed skeletal information and detecting a gesture performed by the user with either the left or right hand and identifying whether the user performed the gesture with the left hand or the right hand based upon the sensed skeletal information. The method can also include altering a graphical user interface on the display device based upon an identity of the user, the detected gesture and whether the gesture was performed by the left hand or the right hand. The method can also include receiving touch input from the user relative to the altered graphical user interface and determining whether the touch input was performed with the user's left hand or the user's right hand. The method can also include further altering the graphical user interface based upon the received touch input and whether the received touch input was determined to have been performed by the user's left hand or the user's right hand.

Any combination of the above and/or below examples where the sensing is performed by a red, green, blue, plus depth (RGBD) camera.

Another example is manifest as a system that includes a display device. The system can also include a first set of sensors configured to sense an area in front of the display device and a second set of sensors configured to detect user input proximate to the display device. The system can also include an interactive component configured to analyze data from the first set of sensors to identify a user and gestures performed by the user to control a graphical user interface presented on the display device and configured to analyze data from the second set of sensors to further refine the control of the graphical user interface.

Any combination of the above and/or below examples where the second set of sensors are touch sensors integrated in the display device to detect user touches of the display device or wherein the second set of sensors are configured to detect user touches before the user actually touches the display device.

Any combination of the above and/or below examples where the first set of sensors are physically mounted on the display device or wherein the first set of sensors are remote from the display device but are communicatively coupled to the interactive component.

Any combination of the above and/or below examples further comprising a processor and storage and wherein the interactive component is stored on the storage for execution by the processor.

Any combination of the above and/or below examples manifest as a touch sensitive tablet type device or notebook computer type device where the second set of sensors is integrated with the display device as touch sensors.

Any combination of the above and/or below examples manifest as a large display device configured to be mounted on a wall or other vertical surface and wherein the first and second sensors are integral to the large display device.

Any combination of the above and/or below examples where the first and second sets of sensors are manifest as red green blue+depth (RGBD) sensors or wherein the first set of sensors are manifest as RGBD sensors and the second set of sensors are manifest as touch sensors.

Any combination of the above and/or below examples where the touch sensors are configured to sense pressure or capacitance.

Any combination of the above and/or below examples where the interactive component is configured to calibrate the display device, the first set of sensors and the second set of sensors by causing a number of objects to be presented in the graphical user interface and instructing the user to touch the objects while being sensed by the first set of sensors and the second set of sensors.

Another example is manifest as a computer-implemented method that includes detecting a user proximate to a display and detecting a non-touch control gesture performed by the user proximate to the display. The method can also include presenting a graphical user interface (GUI) on the display that includes options associated with the control gesture and receiving user input selecting one of the options. The method can further include receiving additional user input from the user to interact with the GUI via the selected one of the options and controlling the GUI based upon the additional user input.

Any combination of the above and/or below examples where the detecting a user proximate the display comprises identifying the user.

Any combination of the above and/or below examples where the identifying the user comprises detecting parameters.

Any combination of the above and/or below examples where the detected parameters are skeletal parameters, facial recognition parameters, and handedness parameters.

Any combination of the above and/or below examples where the identifying the user comprises comparing the detected parameters to stored parameters.

Any combination of the above and/or below examples where the detecting a non-touch control gesture comprises detecting a non-touch control gesture performed by the user's left hand and wherein the receiving user input selecting one of the options and the receiving touch input comprise receiving user input from the user's right hand.

Any combination of the above and/or below examples where the receiving additional user input comprises receiving touch user input or non-touch user input.

Any combination of the above and/or below examples where the options are manifest on a menu.

Any combination of the above and/or below examples where the receiving user input comprises sensing a first hand of the user and wherein receiving additional user input comprises sensing a second hand of the user.

CONCLUSION

Although techniques, methods, devices, systems, etc., pertaining to device control are described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A computing device comprising:
at least one processor; and
one or more computer-readable storage media having instructions stored thereon that, when executed by the at least one processor, cause the at least one processor to:
sense a user proximate to a display device;
identify the user utilizing one or more human recognition algorithms, at least one of the human recognition algorithms relating to sensed skeletal information;
locate the left hand and the right hand of the user from the sensed skeletal information;
detect a non-touch gesture performed by the user with either the left hand or the right hand and identify whether the user performed the non-touch gesture with the left hand or the right hand based at least upon the sensed skeletal information;
alter a graphical user interface on the display device based at least upon an identity of the user, the non-touch gesture, and whether the non-touch gesture was performed by the left hand or the right hand, the graphical user interface being altered by:
presenting a particular menu on the graphical user interface when the non-touch gesture is performed with the left hand; and
presenting content other than the particular menu when the non-touch gesture is performed with the right hand;
receive touch input from the user relative to the altered graphical user interface and determine whether the touch input was performed with the left hand or the right hand; and
further alter the graphical user interface based at least upon the received touch input and whether the received touch input was determined to have been performed by the left hand or the right hand.

2. The computing device of claim 1, wherein the instructions, when executed by the at least one processor, cause the at least one processor to:
in an instance when the non-touch gesture is performed with the left hand, further alter the graphical user interface by:
selecting a menu item from the particular menu based at least on the touch input; and
altering the graphical user interface based at least on the selected menu item.

3. A system, comprising:
a display device;
a first set of sensors configured to sense an area in front of the display device;
a second set of sensors configured to detect user input proximate to the display device; and
a processor configured to:
analyze first data from the first set of sensors to identify a user and non-touch gestures performed by the user;
when the first data indicates that the user performed an individual non-touch gesture, control a graphical user interface presented on the display device by:
presenting a particular menu on the display device when the individual non-touch gesture is performed with the left hand; and
presenting content other than the particular menu when the individual non-touch gesture is performed with the right hand;

when the particular menu is displayed, analyze second data from the second set of sensors to identify a touch gesture performed by the user with respect to the particular menu; and further refine the control of the graphical user interface based at least on the second data by selecting a menu item from the particular menu and modifying the graphical user interface based at least on the selected menu item.

4. The system of claim 3, wherein the second set of sensors are touch sensors integrated in the display device.

5. The system of claim 3, wherein the first set of sensors are physically mounted on the display device.

6. The system of claim 3, wherein the processor is further configured to:
receive user inputs selecting specific menu items to include on the particular menu; and
when the user is identified by analyzing the first data, include the specific menu items on the particular menu.

7. The system of claim 3, manifest as a touch sensitive tablet type device or notebook computer type device where the second set of sensors is integrated with the display device as touch sensors.

8. The system of claim 3, manifest as a large display device configured to be mounted on a wall or other vertical surface and wherein the first and second sets of sensors are integral to the large display device.

9. The system of claim 3, wherein the first set of sensors is manifest as a set of red green blue+depth (RGBD) sensors and the second set of sensors is manifest as a set of touch sensors.

10. The system of claim 9, wherein the touch sensors are configured to sense pressure or capacitance.

11. The system of claim 3, wherein the processor is configured to calibrate the display device, the first set of sensors, and the second set of sensors by causing a number of objects to be presented in the graphical user interface and instructing the user to touch the objects while being sensed by the first set of sensors and the second set of sensors.

12. A computer-implemented method, comprising:
detecting a user proximate to a display;
detecting a non-touch gesture performed by the user;
determining whether the non-touch gesture is performed by the left hand or the right hand of the user;
presenting a particular menu on the display when the non-touch gesture is performed with the left hand;
presenting content other than the particular menu on the display when the non-touch gesture is performed with the right hand;
when the particular menu is displayed, receiving a touch input identifying a selected menu option from the particular menu;
receiving a further touch input from the user; and
controlling the display based at least upon the selected menu option and the further touch input.

13. The method of claim 12, wherein the detecting the user proximate the display comprises identifying the user.

14. The method of claim 13, wherein the identifying the user comprises detecting parameters.

15. The method of claim 14, wherein the detected parameters include skeletal parameters, facial recognition parameters, and handedness parameters.

16. The method of claim 14, wherein the identifying the user comprises comparing the detected parameters to stored parameters.

17. The method of claim 12, further comprising:
receiving user input identifying specific menu items to include in the particular menu;
determining an identity of the user; and
presenting the specific menu items on the particular menu based at least on the identity of the user.

18. The method of claim 17, further comprising:
capturing a depth image of the user; and
determining the identity of the user from the depth image.

19. The method of claim 12, wherein the particular menu is a color palette, the selected menu option identifies a selected color, the further touch input comprises writing input, and the controlling comprises showing the writing input on the display in the selected color.

20. The method of claim 18,
further comprising:
detecting skeletal data of the user from the depth image; and
using the skeletal data to determine whether the user performed the non-touch gesture with the right hand or the left hand.

* * * * *